United States Patent
Nishimura et al.

[11] Patent Number: 5,913,504
[45] Date of Patent: Jun. 22, 1999

[54] FLUID CONTROLLER

[75] Inventors: Ryutaro Nishimura; Tetsuya Kojima, both of Osaka, Japan

[73] Assignee: Fujikin Incorporated, Osaka, Japan

[21] Appl. No.: 09/143,663

[22] Filed: Aug. 31, 1998

[30] Foreign Application Priority Data

Sep. 22, 1997 [JP] Japan .................................. 9-256578

[51] Int. Cl.[6] .................................................. F16K 31/122
[52] U.S. Cl. .................................................. 251/62; 251/337
[58] Field of Search ........................ 251/62, 63, 63.5, 251/337

[56] References Cited

U.S. PATENT DOCUMENTS

| | | |
|---|---|---|
| 3,457,842 | 7/1969 | Tennis . |
| 3,654,839 | 4/1972 | Thompson . |
| 4,180,274 | 12/1979 | Tucek . |
| 4,223,867 | 9/1980 | Niino et al. ............................. 251/62 |
| 4,236,875 | 12/1980 | Widdowson ........................... 251/57 X |
| 4,372,333 | 2/1983 | Goans ................... 251/63.4 X |
| 4,721,283 | 1/1988 | Wilson ................... 251/63.4 |
| 4,728,132 | 3/1988 | Brammall . |

FOREIGN PATENT DOCUMENTS

| | | |
|---|---|---|
| 507 373 | 4/1953 | Belgium . |
| 2 625 264 | 6/1989 | France . |
| 21 33 672 | 1/1973 | Germany . |

*Primary Examiner*—Kevin Lee
*Attorney, Agent, or Firm*—Armstrong, Westerman, Hattori, McLeland & Naughton

[57] ABSTRACT

A ring divided in two is fitted around a valve stem at a portion thereof projecting upward beyond a piston, with a C-ring fitted around the divided ring. The divided ring has an annular projection formed on its inner periphery and fitted in an annular groove which is formed in the valve stem at the portion thereof projecting upward beyond the position. The divided ring is formed in its outer periphery with an annular recess having fitted therein the inner peripheral portion of the C-ring.

1 Claim, 3 Drawing Sheets

FLUID CONTROLLER

BACKGROUND OF THE INVENTION

The present invention relates to fluid controllers, and more particularly to fluid controllers wherein fluid pressure is used for moving a valve stem upward and downward.

Fluid controllers are already known wherein a piston attached to the upper end of a valve stem is driven by fluid pressure to move the valve stem upward and downward and thereby open and close a fluid channel. FIG. 3 shows an example of such a fluid controller, which comprises a valve body 1, a bonnet 2 secured to the upper end of the valve body 1, a cylinder 3 fixed to the upper end of the bonnet 2 and having an upward opening, a cylinder head 4 fitted over the cylinder 3, a valve stem 5 in the form of a solid cylinder and having a lower portion positioned in the valve body 1, an intermediate portion positioned inside the bonnet 2 and an upper portion positioned inside the cylinder 3, a valve element 6 provided at the lower end of the valve stem 5, a piston 7 mounted on the upper end of the valve stem 5, an annular flange 8 secured to the intermediate portion of the valve stem 5, and a coiled compression spring 9 bearing on the top wall of the bonnet 2 for biasing the valve stem 5 downward.

When the fluid controller is in the usual state, the valve stem 5 is held depressed by the elastic force of the compression spring 9, closing a communication passageway 12 between an inlet passageway 10 and an outlet passageway 11. The communication passageway 12 between the passageways 10 and 11 is opened by a fluid flowing into a cylinder chamber 14 through a working fluid inflow passageway 13 in the cylinder 3 and pushing up the piston 7.

The piston 7 is connected to the valve stem 5, for example, by an E-ring 16 fitted in an annular groove 15 formed in the valve stem 5 at the portion thereof projecting upward beyond the piston 7.

FIG. 4 shows on an enlarged scale the portion of the piston 7 connected to the valve stem 5. The E-ring 16 comprises a C-shaped member 17, and three claws 18 integral with the inner periphery of the member and each having an inner end fitted in the annular groove 15.

Alternatively, a U-ring 19 is used in place of the E-ring 16. FIG. 5 shows the U-ring 19. Base portions of bifurcated part of the ring 19 are fitted in the annular groove 15 formed in the valve stem 5.

The E-ring 16 and the U-ring 19 have a spring property, are fittable around the valve stem 5 when spread out at the opening, and are prevented from slipping off on contracting at the opening after fitting around the stem. Thus, the piston 7 is connected to the valve stem 5, and the fluid pressure acting on the piston 7 is transmitted to the valve stem 5 through the ring 16 or 19.

The conventional fluid controller has the problem that when the piston is subjected to a pressure greater than the prescribed pressure, a shearing force due to the fluid pressure acting on the piston breaks the E-ring or U-ring connecting the piston to the valve stem. Even if it is attempted to give an increased strength to the ring by using a different material for the ring, the ring material is not selectable as desired because of the limiting requirement that the ring needs to have a spring property, consequently imposing a limitation on the improvement of durability of the connection between the valve stem and the piston.

SUMMARY OF THE INVENTION

An object of the present invention is to provide a fluid controller wherein the connection between a valve stem and a piston is given improved durability.

The present invention provides a fluid controller wherein a piston connected to an upper end of a valve stem is driven by fluid pressure to thereby move the valve stem upward and downward and open and close a fluid channel, the fluid controller being characterized in that a ring divided in two is fitted around the valve stem at a portion thereof projecting upward beyond the piston, a C-ring being fitted around the divided ring, the divided ring having an annular projection formed on an inner periphery thereof, the valve stem being formed with an annular groove having the annular projection fitted therein, the divided ring being formed in an outer periphery thereof with an annular recess having fitted therein an inner peripheral portion of the C-ring.

The divided ring has an inside diameter approximately equal to the diameter of the annular groove. The shearing stress acting on the ring is expressed by the load on the piston divided by the sectional area of the portion of the ring in contact with the valve stem. The portion of the ring in contact with the annular grooved portion of the valve stem has an area which is approximately equal to the area of the bottom of the annular groove multiplied by 0.35 to 0.45 when the ring is an E-ring, or an area which is approximately equal to the area of the bottom of the annular groove multiplied by 0.5 to 0.55 when the ring is a U-ring. On the other hand, the area is approximately equal to the area of the bottom of the annular groove multiplied by 0.9 to 1.0 in the case of the divided ring of the invention. Accordingly to the invention, therefore, the divided ring is subjected to a reduced shearing stress, giving an increased strength to the connection between the valve stem and the piston.

The divided ring, which need not have a spring property, can be made of a material having strength against shearing forces. This affords an increased breaking strength to the ring. This effect and also the effect resulting from the configuration of the divided ring further improve the durability of the connection between the valve stem and the piston. The C-ring can be a commercial one. The commercial C-ring is usable when the annular recess in the outer periphery of the divided ring is made to have a diameter in conformity with the commercial C-ring.

DESCRIPTION OF THE PREFERRED EMBODIMENT

An embodiment of the invention will be described below with reference to the drawings concerned.

Figure 1:
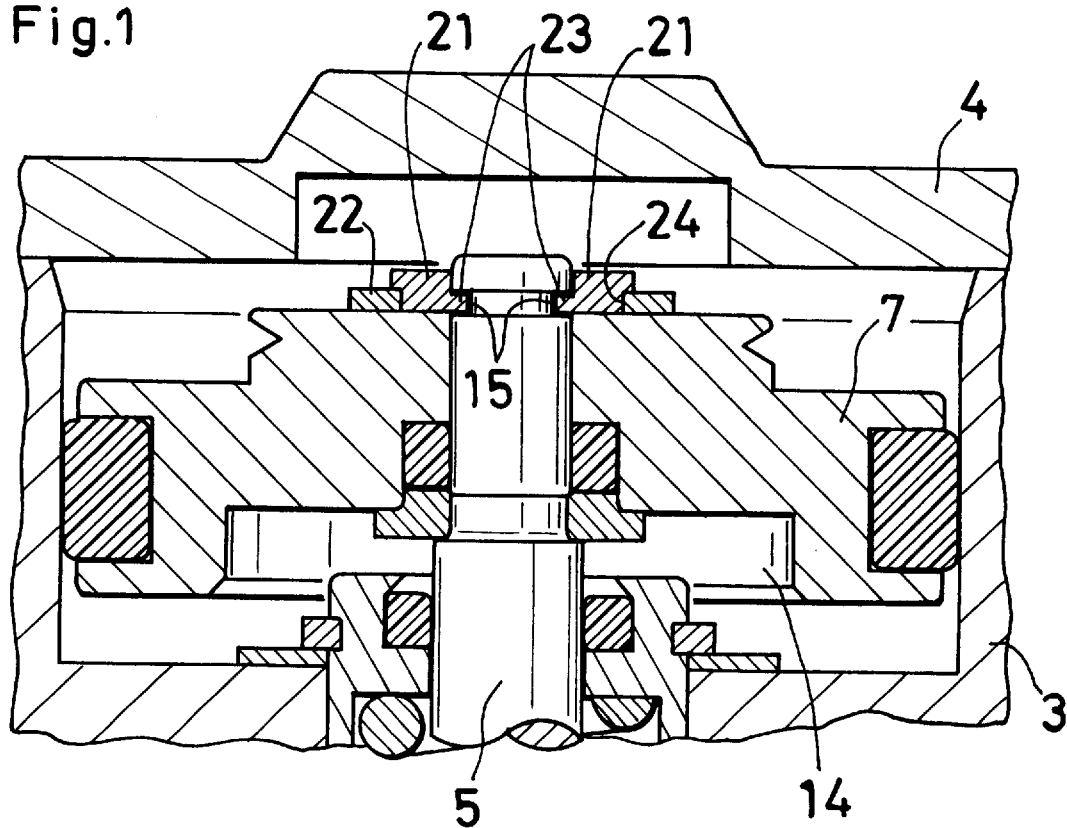
FIG. 1 is a fragmentary view in vertical section showing a fluid controller embodying the invention.
Figure 2:
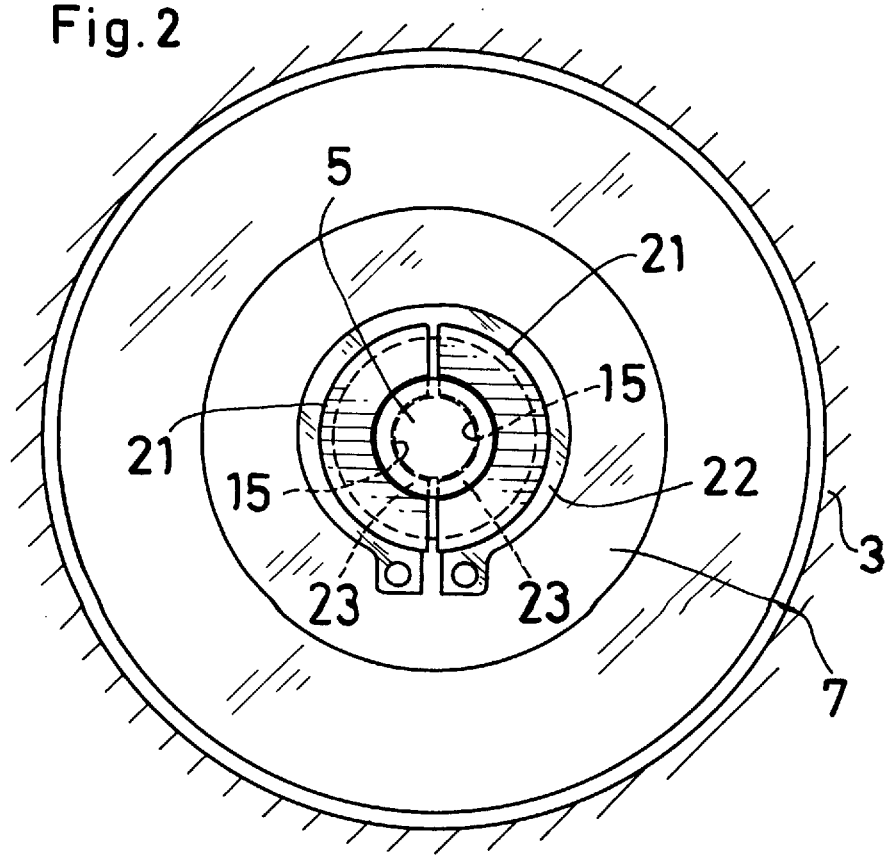
FIG. 2 is a view in cross section of the same.
Figure 3:
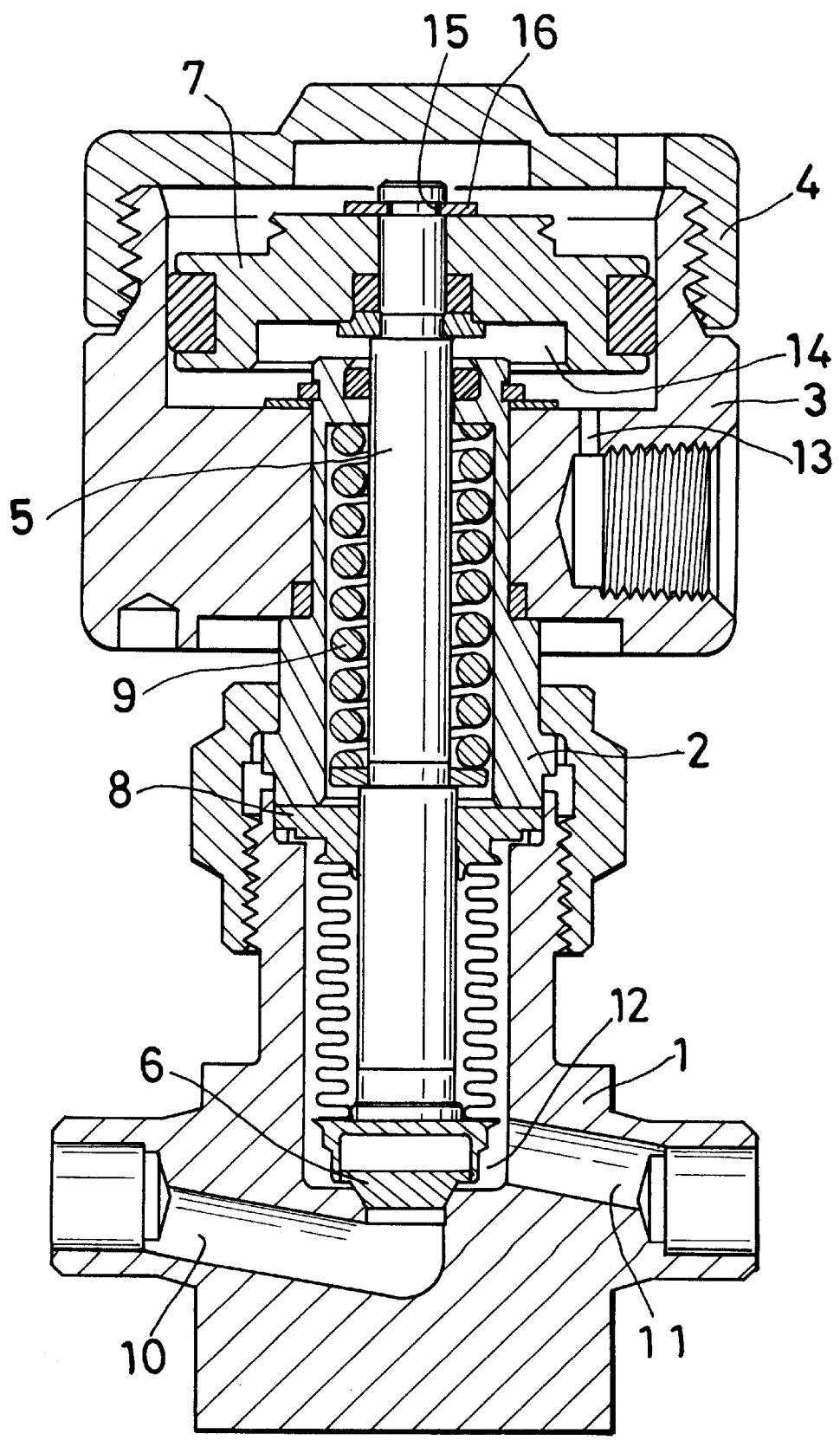
FIG. 3 is a view in vertical section showing a conventional fluid controller.
Figure 4:
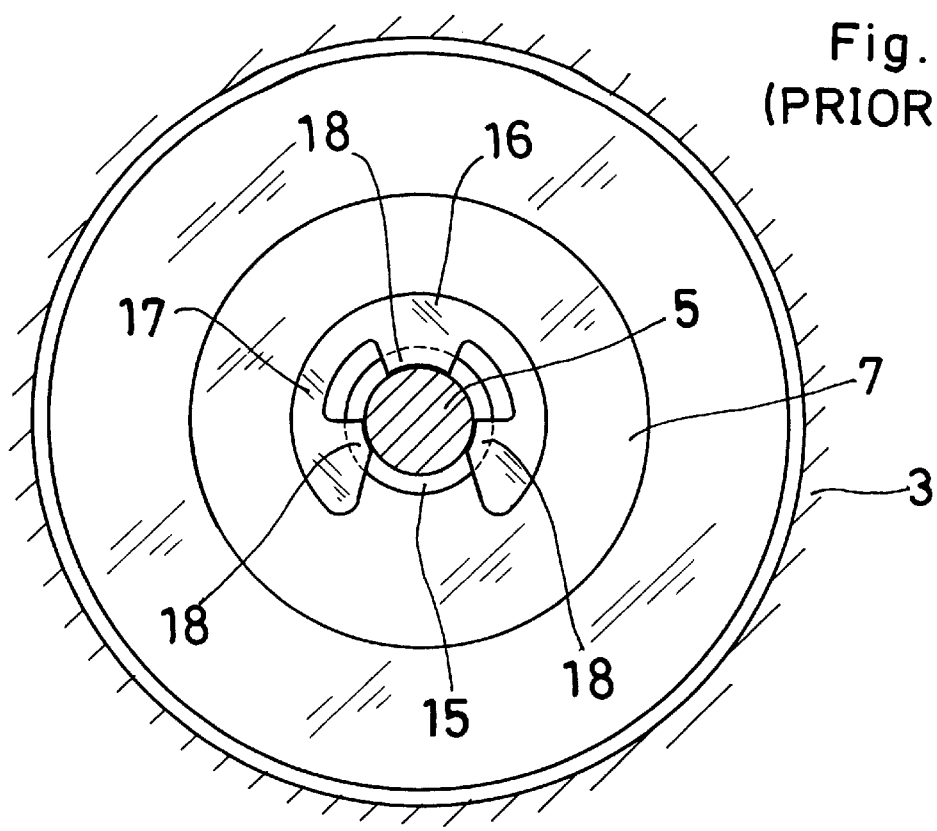
FIG. 4 is a fragmentary view in cross section showing the conventional fluid controller.
Figure 5:
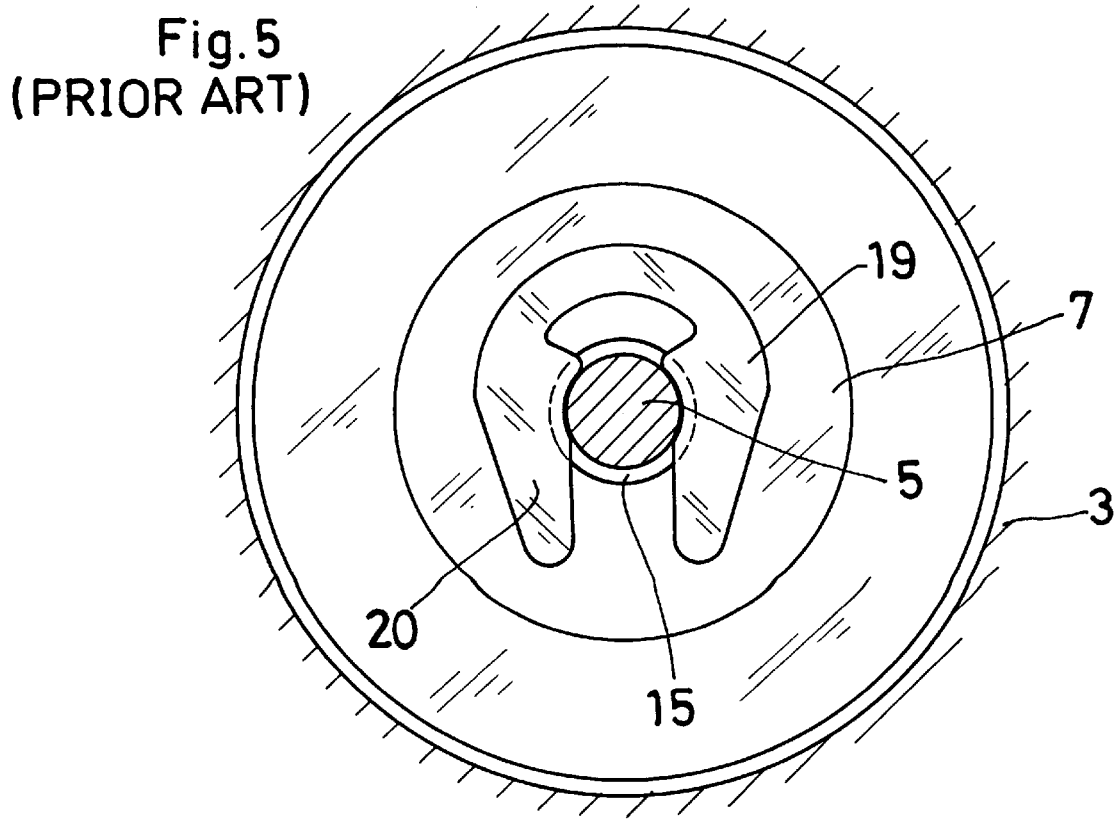
FIG. 5 is a fragmentary view in cross section showing another conventional fluid controller.

The present invention is embodied as a fluid controller of the type shown in FIG. 3, wherein the connection between the valve stem and the piston is given improved durability. FIGS. 1 and 2 show the main feature of the improvement.

With reference to FIGS. 1 and 2, a ring 21 divided in two is fitted around a valve stem 5 at the portion thereof projecting upward beyond a piston 7. A C-ring 22 is fitted around the divided ring 21.

The divided ring 21 has an annular projection 23 formed on its inner periphery and fitted in an annular groove 15 which is formed in the valve stem 5 at the portion thereof projecting upward beyond the piston 7. The ring 21 is formed in its outer periphery with an annular recess 24 having fitted therein the inner peripheral portion of the C-ring 22.

The portion of the valve stem 5 projecting upward beyond the piston 7 has an outside diameter of 6 mm. The annular groove 15 is 4 mm in diameter and 0.6 mm in width. The divided ring 21 is made of SUS303 and is 1.0 mm in overall thickness, 0.6 mm in the thickness of the annular projection 23, 0.7 mm in the width of the annular recess 24, 6 mm in outside diameter, 5.7 mm in the diameter of the annular recess 24, 4.1 mm in inside diameter and 3 mm in the diameter of the annular projection 23. The C-ring 22 is a commercial standard product with a nominal size of 8.

When a fluid is caused to flow into a cylinder chamber 14 defined by a cylinder 3 and the piston 7, an upward force acts on the piston 7 and is delivered to the valve stem 5 through the divided ring 21. At this time, the annular projection 23 of the ring 21 is subjected to a great shearing force. With the structure described above, the increase in the sectional area of the portion of the divided ring 21 in contact with the valve stem 5 (i.e., the annular projection 23) reduces the shearing stress on the ring 21. The connection between the valve stem 5 and the piston 7 is improved in durability by this effect plus an increased strength imparted to the divided ring 21 by using a different material for the ring 21 and giving an increased overall thickness to the ring 21.

Table 1 shows the result of comparison between the fluid controller of the invention and the conventional controllers wherein the E-ring and U-ring are used, respectively. This table reveals that the shearing stress in the connection between the valve stem 5 and the piston 7 is smaller in the controller of the invention than in the conventional ones.

Consequently, the invention gives an exceedingly higher durability than the prior art.

TABLE 1

| Material | Invention SUS303 | E-ring SUS304 | U-ring SUS304 |
|---|---|---|---|
| Ring thickness (mm) | 1.0 | 0.6 | 0.6 |
| Area of contact with stem (mm$^2$) | 5.0 | 2.11 | 2.91 |
| Shearing stress (kgf/mm$^2$) | 2.7 | 8.2 | 4.2 |

The arrangement described above is usable also in fluid controllers other than the one shown in FIG. 3 insofar as the controllers are so adapted that a piston provided at the upper end of a valve stem is movable upward and downward by fluid pressure to thereby open and close a fluid channel.

What is claimed is:

1. A fluid controller wherein a piston connected to an upper end of a valve stem is driven by fluid pressure to thereby move the valve stem upward and downward and open and close a fluid channel, the fluid controller being characterized in that a ring divided in two is fitted around the valve stem at a portion thereof projecting upward beyond the piston, a C-ring being fitted around the divided ring, the divided ring having an annular projection formed on an inner periphery thereof, the valve stem being formed with an annular groove having the annular projection fitted therein, the divided ring being formed in an outer periphery thereof with an annular recess having fitted therein an inner peripheral portion of the C-ring.

* * * * *